Nov. 24, 1925.
R. C. BURNS
LOCOMOTIVE POWER REVERSE GEAR
Filed May 28, 1923
1,562,939
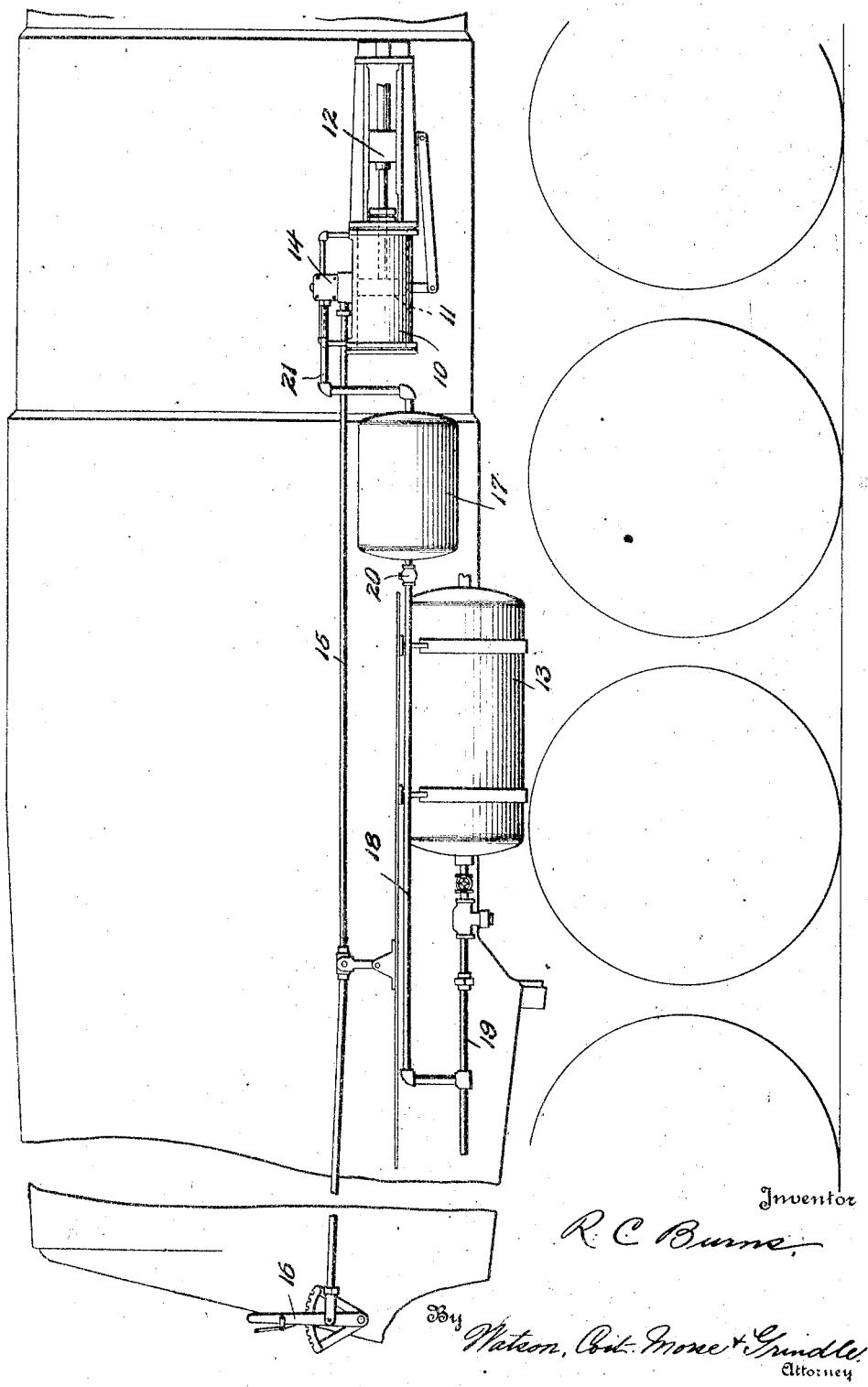
Inventor
R. C. Burns,
By Watson, Coit, Morse & Grindle
Attorney Patented Nov. 24, 1925.

1,562,939

UNITED STATES PATENT OFFICE.

ROBERT C. BURNS, OF ALTOONA, PENNSYLVANIA.

LOCOMOTIVE POWER REVERSE GEAR.

Application filed May 23, 1923. Serial No. 642,055.

*To all whom it may concern:*

Be it known that I, ROBERT C. BURNS, a citizen of the United States, and resident of Altoona, Blair County, State of Pennsylvania, have invented certain new and useful Improvements in Locomotive Power Reverse Gears, of which the following is a specification.

This invention relates to power operated reverse gear mechanism for locomotives and particularly to an arrangement for supplying the pressure fluid for operating such mechanism.

The object of the invention is to provide means by which power operation of the reverse gear mechanism may be accomplished even though a failure occurs in the main supply of compressed air or other fluid used to operate the gearing. The advantages of the invention will be apparent from the following specification taken in connection with the accompanying drawing forming a part thereof, and in which there is illustrated somewhat diagrammatically a locomotive reverse gear system embodying this invention.

As is well known, the power reverse gear mechanism usually employed on locomotives comprises a cylinder to which compressed air is supplied from the main air reservoir on the locomotive, and which contains a piston connected to the reverse gearing for operating the latter, the admission of compressed air to the cylinder for moving the piston being controlled by suitable valve mechanism operated from the locomotive cab. This arrangement is open to objection. In case of failure of the air pressure due to breakage of a pipe or other cause, it may result that no pressure is available to operate the reverse gearing so that serious accident might occur because the engineer would have no means for stopping the locomotive except by closing the throttle. It has been proposed to remedy this objection by connecting a steam pipe to the cylinder of the reverse gear mechanism so that in case of emergency the engineer can, by opening a suitable valve, admit steam to this cylinder for operating the reverse gearing. In some cases the mechanism is designed to use steam alone as the motive fluid for operating the gears. With either of these arrangements, however, practical difficulties are encountered. The use of steam alone requires metal packing in the piston. Such packing is not as economical or reliable as fiber packing which is generally employed when air alone or when both air and steam are used. Such fiber packing is quickly destroyed by steam and requires renewal. This would not be serious, particularly when both air and steam are used, if the steam were employed only in case the air supply failed. But experience has shown that hostlers and others employed around locomotives frequently open the steam valves to the reverse gear cylinder, and furthermore the steam valves are apt to become leaky. The result is a very short life for the fiber packing. Furthermore, when steam is used either alone or as an emergency substitute for air, it is not uncommon to find the gear operating mechanism frozen in cold weather.

The present invention provides a simple and efficient means of overcoming these difficulties. Referring to the accompanying drawings illustrating the invention, 10 indicates the cylinder of a compressed air motor for operating the reverse gear mechanism. A piston 11 indicated in dotted lines is arranged in this cylinder and is connected to a cross-head 12 which in turn is connected to the gear mechanism (not shown). The cylinder 10 is supplied with compressed air from the main air reservoir 13 mounted on the locomotive. Valve mechanism of any suitable kind indicated at 14 is employed for controlling admission of the air to the cylinder 10 to move the piston 11 in the direction desired, this valve mechanism being connected by a rod 15 to a suitable control lever 16 in the locomotive cab. According to the present invention a small auxiliary air reservoir is interposed in the pipe line between the main air supply and the cylinder 10 of the gear operating motor. A pipe 18 connects the small reservoir 17 with a pipe 19 which in turn is connected to the main air reservoir 13. A suitable non-return check valve 20 is placed in the pipe 18 which valve permits flow of compressed air toward but not from the reservoir 17. A pipe 21 connects the reservoir 17 with the cylinder 10.

Briefly describing the operation of this arrangement it will be understood that where there is compressed air in the main compressed air system of the locomotive, that is in the reservoir 13 and the pipes connected therewith, the auxiliary reservoir will also contain compressed air which is supplied through the pipe 18. In case the main air supply fails due to breakage of a pipe or other cause, while the locomotive is in motion, the air which is in the reservoir 17 will not escape but will be entrapped by the closing of the check valve 20. A reserve supply of compressed air is thus provided. The size of the reservoir 17 should of course be such that the compressed air entrapped therein will furnish sufficient power to operate the reverse gear mechanism. It has been found that with a reservoir 16 inches in diameter and 33 inches long and with air pressure of 100 pounds, the entrapped air will suffice to operate the reverse gear mechanism through several complete cycles, that is from full forward to full backward and forward again. This arrangement, therefore, overcomes the possibility of the engineer being without means to stop the locomotive and at the same time it obviates the difficulties present when steam or steam and air are employed.

It is, of course, to be understood that the reservoir 17 may be connected to or associated with the reservoir 13 in any desired manner and that the invention is not limited to the particular manner illustrated for connecting these reservoirs. Other changes in the details of construction may also be made without departing from the spirit of the invention.

Having thus described the invention what is claimed as new and desired to be secured by Letters Patent is:

1. In combination, a pressure fluid motor for operating the power reverse gear mechanism of a locomotive, a compressed air system mounted on the locomotive, an auxiliary air reservoir adapted to receive and hold a reserve supply of compressed air to operate said motor in case of failure of the air system, a conduit for supplying compressed air from said system to said reservoir, means for preventing escape of the compressed air from said reservoir through said conduit upon drop of pressure in the latter, and a second conduit for supplying compressed air from said reservoir to said motor.

2. In combination, a pressure fluid motor for operating the reverse gear mechanism of a locomotive, a main compressed air reservoir mounted on the locomotive, an auxiliary reservoir adapted to contain a reserve supply of compressed air to operate said motor in case of failure of the main air supply, a conduit for supplying compressed air from said main reservoir to said auxiliary reservoir, a check valve in said conduit for preventing flow of compressed air from said auxiliary reservoir toward said main reservoir, and a second conduit for supplying compressed air from said auxiliary reservoir to said motor.

3. In combination, a pressure fluid motor for operating the reverse gear mechanism of a locomotive, a compressed air system carried by the locomotive, an auxiliary reservoir for receiving a reserve supply of compressed air to operate said motor in case of failure of the main supply, a pipe for supplying compressed air from said system to said reservoir, means in said pipe for preventing flow of compressed air from said reservoir toward said system upon drop of pressure in the latter, and a second pipe for conducting compressed air from said reservoir to said motor.

4. In combination, a compressed air motor for operating the reverse gear mechanism of a locomotive, a main compressed air reservoir, an auxiliary compressed air reservoir, a pipe for conducting compressed air from the former to the latter, a check valve in said pipe arranged to prevent flow of compressed air from said auxiliary reservoir, a pipe for conducting compressed air from said auxiliary reservoir to said motor, and manually operated means for controlling admission of compressed air to said motor.

In testimony whereof I hereunto affix my signature.

ROBERT C. BURNS.